United States Patent [19]

Nishikawa et al.

[11] Patent Number: 4,625,589
[45] Date of Patent: Dec. 2, 1986

[54] CREEP PREVENTING DEVICE FOR VEHICLE EQUIPPED WITH AUTOMATIC TRANSMISSION

[75] Inventors: Masao Nishikawa, Tokyo; Takashi Aoki, Fujimi; Yoichi Sato, Wako; Yukihiro Fukuda, Asaka, all of Japan

[73] Assignee: Honda Giken Kogyo Kabushiki Kaisha, Tokyo, Japan

[21] Appl. No.: 594,594

[22] Filed: Mar. 29, 1984

[30] Foreign Application Priority Data

Apr. 6, 1983 [JP] Japan .................................. 58-60362

[51] Int. Cl.⁴ ....................... B60K 41/18; B60K 41/16
[52] U.S. Cl. ...................................... 74/856; 74/867
[58] Field of Search .................. 74/869, 868, 867, 866

[56] References Cited

U.S. PATENT DOCUMENTS

| | | | |
|---|---|---|---|
| 3,890,856 | 6/1975 | Miyauchi et al. | 74/869 |
| 4,313,353 | 2/1982 | Honig | 74/867 X |
| 4,494,640 | 1/1985 | Honig | 74/868 X |
| 4,503,733 | 3/1985 | Hasegawa | 74/866 X |
| 4,513,638 | 4/1985 | Nishikawa et al. | 74/866 |
| 4,513,639 | 4/1985 | Hiramatsu | 74/866 |

FOREIGN PATENT DOCUMENTS 3019274 11/1981 Fed. Rep. of Germany ........ 74/866
0063046 5/1980 Japan ................................... 74/866

Primary Examiner—Kenneth J. Dorner
Assistant Examiner—Dirk Wright
Attorney, Agent, or Firm—Armstrong, Nikaido, Marmelstein & Kubovcik

[57] ABSTRACT

In a creep preventing device for vehicles equipped with an automatic transmission comprising: a fluid type torque converter; an auxiliary transmission having a frictionally engaging element for starting and connected to the torque converter; and a creep preventing valve disposed in an oil passage branched from an operating oil passage leading to the frictionally engaging element to communicate with an oil tank and adapted to open the oil passage during the idle operation of the vehicle, the improvement wherein the creep preventing valve includes an oil chamber for closing the valve when oil pressure above a predetermined level is introduced thereto, and an oil passage for guiding the oil pressure from an engine output proportional signal pressure generating means, which releases the signal pressure proportional to the engine output, is connected to the oil chamber, whereby the engaging force of the clutch for starting can be controlled in an analog fashion to ensure the smooth reengaging operation of the clutch.

6 Claims, 5 Drawing Figures

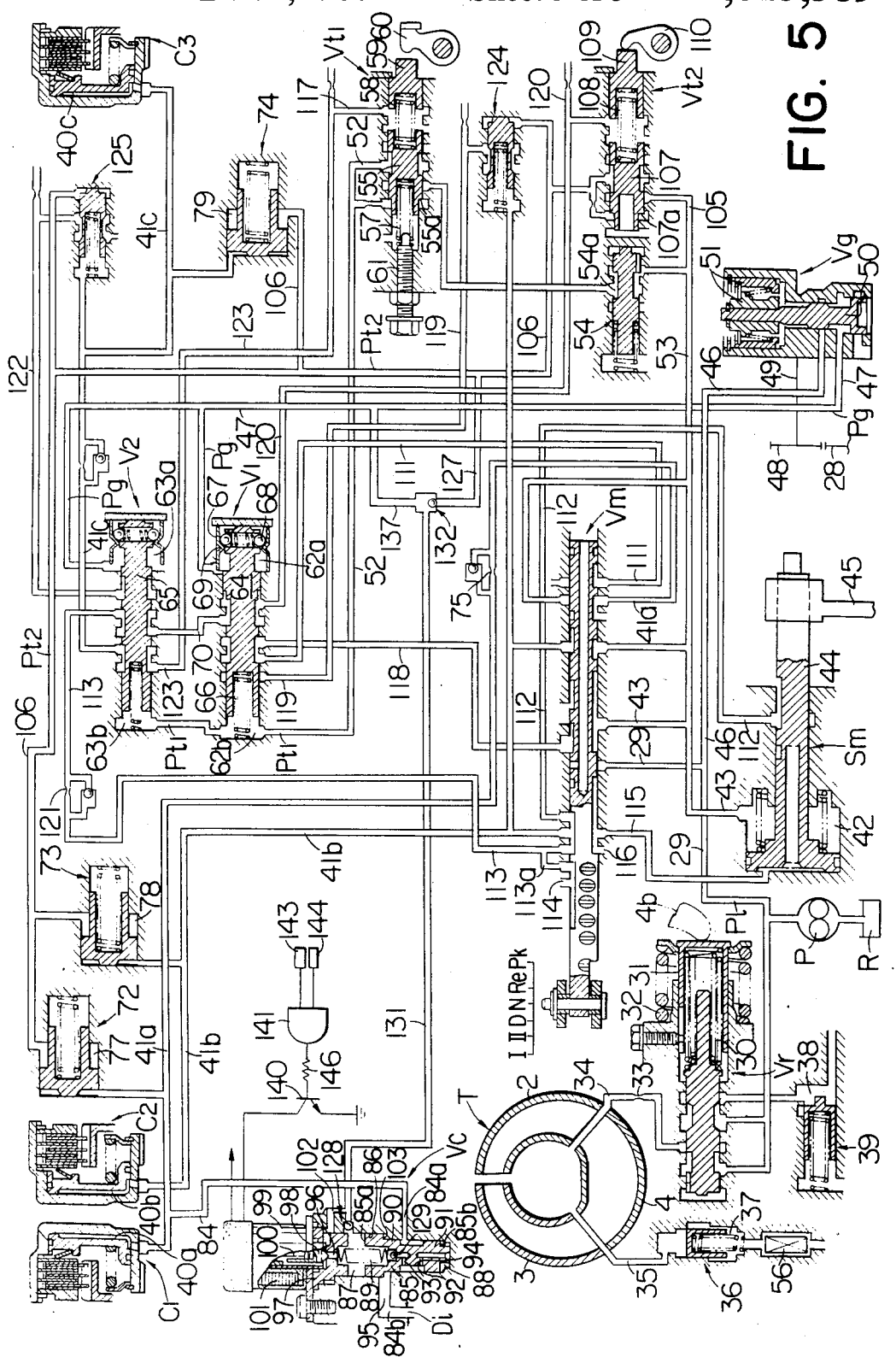

CREEP PREVENTING DEVICE FOR VEHICLE EQUIPPED WITH AUTOMATIC TRANSMISSION

BACKGROUND OF THE INVENTION

1. Field of the Invention

This invention relates to a creep preventing device for vehicles equipped with an automatic transmission.

2. Description of the Prior Art

With a speed change lever being set in the drive position (forward-movement position) during a stop, vehicles equipped with an automatic transmission present the so-called creep phenomenon that the vehicle tends to move forward against an intention of the driver due to the dragging torque of a torque converter. Such a creep force is going to apply a brake force to the engine during the idle operation. To hold the number of revolutions of the engine during the idle operation at a reference value, therefore, it is required to increase the opening degree of a throttle valve during the idle operation to a certain extent for compensating the brake force. This increases fuel consumption as a matter of course and was one of primary causes to increase the fuel cost of vehicles equipped with an automatic transmission.

In veiw of the above, the assignee of the present invention has previously proposed an improvement in that the idle operation state of a vehicle is detected and the pressure exerting on a starting clutch is bypassed to an oil tank to interrupt power transmission between the engine and driving wheels, so that the load upon the engine becomes the same level as that in vehicles equipped with a manual transmission. Such an improvement has, however, accompanied a drawback as follows. Since the starting clutch is controlled to reengage based on the digital value of ON/OFF type when an accelerator pedal is trod on, some shock causes unavoidably at the time of reengagement and hence it is difficult to ensure the smooth starting operation from the standpoint of mass production. Such starting shock can be alleviated by provision of various gradually increasing pressure mechanisms, e.g., accumulator, which can moderately increase the rising speed of oil pressure when the starting clutch is reengaged. If an accumulator is arranged to actuate when the accelerator pedal is trod on, there tends to cause a time lag at the time of quick starting. This results in a limitation that capacity of the accumulator can not be set so large. Thus, the above improvement could not offer the basic solution.

SUMMARY OF THE INVENTION

Therefore, the first object of the present invention is to provide a creep preventing device for vehicles equipped with an automatic transmission in which reengagement of a starting clutch at the time of treading on an accelerator pedal is controlled in an analog fashion in proportion to an tread-on amount of the accelerator pedal, thereby to alleviate the shock caused when the starting clutch is reengaged. Particularly, when the accelerator pedal is heavily trod on at the time of, for example, quick starting, a reengaging force of the starting clutch is intensified to eliminate a time lag, thereby to ensure good responsivity.

For the purpose of controlling the engaging pressure of the starting clutch, such a creep preventing device includes a creep preventing valve hydraulically operated. The creep preventing valve is usually composed of a slide valve. In some cases, however, the slide valve loses smoothness in its operation due to the presence of impurities such as dust in oil. If the value operation becomes non-smooth at the time of starting, the shock at the time of reengagement of the starting clutch is still more enlarged. The excessively large shock may result in abnormal wear of the starting clutch. This is caused by the fact that a moving force of the creep preventing valve toward its rest position is so weak that the valve is easily stopped from moving even with small resistance due to dust or the like.

Therefore, the second object of the present invention is to provide a creep preventing device for vehicles equipped with an automatic transmission in which the creep preventing valve is forcedly shifted to its inoperative position by the hydraulic servo pressure at the time of starting the vehicle, thereby ensuring high reliability.

According to the first feature of the invention for achieving the above first and second objects, the creep preventing valve includes an oil chamber for closing the valve when oil pressure above a predetermined level is introduced thereto, and to which oil chamber is connected an oil passage for guiding the oil pressure from an engine output proportional signal pressure generating means which outputs the signal pressure proportional to engine output.

As compared with the conventional automatic transmission, the automatic transmission equipped with a creep preventing mechanism is disadvantageous in that an extent of backward movement is increased at the time of starting on an uphill road. If the starting operation is effected using a foot brake or side brake, there causes no problem even in such a case. It is, however, desirable for the driver, who relies on just one foot to effect the starting operation, to improve the disadvantage as much as possible. From this reason, there is known a technique that, when the foot is detached from the brake pedal, the operation of the creep preventing mechanism is released to restore the creep action. In such a technique, in order not to deteriorate reliability of the brake system, release of the brake is detected electrically without using brake oil pressure. This system needs a solenoid valve to be included in the creep preventing mechanism. It is required to achieve the foregoing first and second objects while allowing the presence of such system, without interfering with the system.

Therefore, the third object of the present invention is to provide a creep preventing device for vehicles equipped with an automatic transmission wherein an analog control system is introduced which is compatible with an electric digital control system.

According to the second feature for achieving the above third object, the creep preventing valve includes an oil chamber for closing the valve when oil pressure above a predetermined level is introduced thereto, and to which oil chamber is connected an oil passage, through a check valve allowing oil to flow only in a direction toward the oil chamber from the oil passage, for guiding the oil pressure from an engine output proportional signal pressure generating means which outputs the signal pressure proportional to engine output; the oil chamber is communicated with the operating oil passage through an orifice; and a solenoid valve actuated to discharge the pressurized oil from the oil chamber during the idle operation is provided in association with the oil chamber.

Moreover, there is known an automatic transmission in which the starting clutch is used also for the engine brake. From the standpoint of the present tendency toward the higher change gear ratio for the purpose of mainly improving fuel saving, the automatic transmission of this kind, in which the starting stage having the lowest change gear ratio is used for applying the engine brake, is expected to continue to exist in future. If such an automatic transmission is equipped with the creep preventing mechanism, the engine brake is effected in the normally operated state of the system but, should the creep preventing mechanism be failed in its operated position, the engine brake would not be effected at some shift position. It is thus desirous to devise some measure to cope with the above failed condition. As one of possible measures, there is known a technique that the creep preventing valve is forcedly shifted by the oil pressure to its inoperative position when the change lever is at a shift position where the engine brake is effected. From this reason, it is required to design a simple, high-reliable system which can achieve the foregoing first and second objects and also which is compatible with the above system.

Therefore, the fourth object of the present invention is to provide a creep preventing device for vehicles equipped with an automatic transmission such that the speed change stage actuating a creep preventing mechanism serves as a speed change stage for effecting the engine brake, wherein the creep preventing valve is constituted to be forcedly shifted to its inoperative position at the time of applying the engine brake, while achieving the above-mentioned first object.

The third and fourth features have been proposed to achive the foregoing fourth object. According to the third feature, the creep preventing valve includes an oil chamber for closing the valve when oil pressure above a predetermined level is introduced thereto, and an engine output proportional signal pressure generating means, which outputs the signal pressure proportional to engine output, and an oil passage communicating with an oil pressure source in interlocking relation with movement of the shift lever into the engine brake position are connected to the oil chamber through a high-select valve adapted to select the higher oil pressure and output the same.

According to the fourth feature the engine output proportional signal pressure generating means and a vehicle speed proportional signal pressure generating means, which outputs the signal pressure proportional to the vehicle speed, are connected to the oil chamber of the creep preventing valve through a high-select valve adapted to select the higher oil pressure and output the same.

The above and other objects, features and advantages of the present invention will be further apparent from the description of preferred embodiments which will be explained in detail with reference to the drawings.

BRIEF DESCRIPTION OF THE DRAWINGS

FIG. 5 is an oil pressure control circuit diagram showing still another embodiment of the present invention.

DESCRIPTION OF THE PREFERRED EMBODIMENTS

Hereinafter, preferred embodiments of the present invention will be described in detail with reference to the accompanying drawings.

Figure 1:
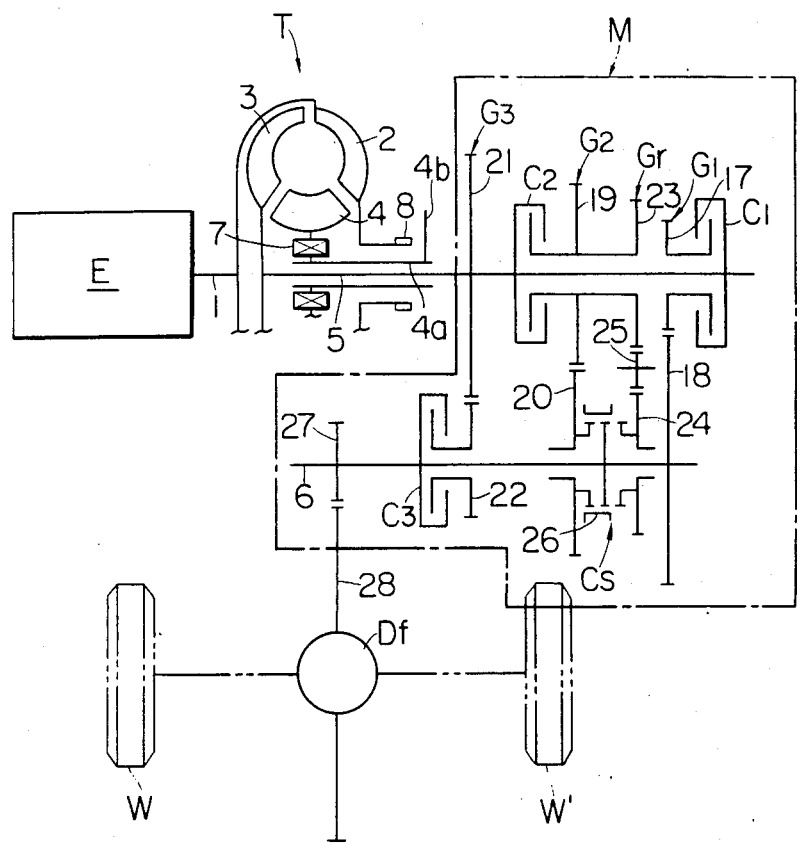
FIG. 1 is a schematic view of an automatic transmission for an automobile with three stages of forward movement and one stage of backward movement.

Referring first to FIG. 1 there is shown a schematic view of an automatic transmission for an automobile with three stages of forward movement and one stage of backward movement, the output of an engine E is transmitted, via a torque converter T, an auxiliary transmission M and a differential device Df in said order, from a crank shaft 1 to driving wheels W, W' to drive the latter.

The torque converter T comprises a pump vane wheel 2 connected to the crank shaft 1, a turbine vane wheel 3 connected to an input shaft 5 of the auxiliary transmission M, and a stator vane wheel 4 connected through a one-way clutch 7 to a stator shaft 4a relatively rotatably supported on the input shaft 5. The torque transmitted from the crank shaft 1 to the pump vane wheel 2 is transmitted to the turbine vane wheel 3 fluid-dynamically, and when amplifying action of torque is effected during that period, the stator vane wheel 4 bears the reaction thereof.

Figure 2:
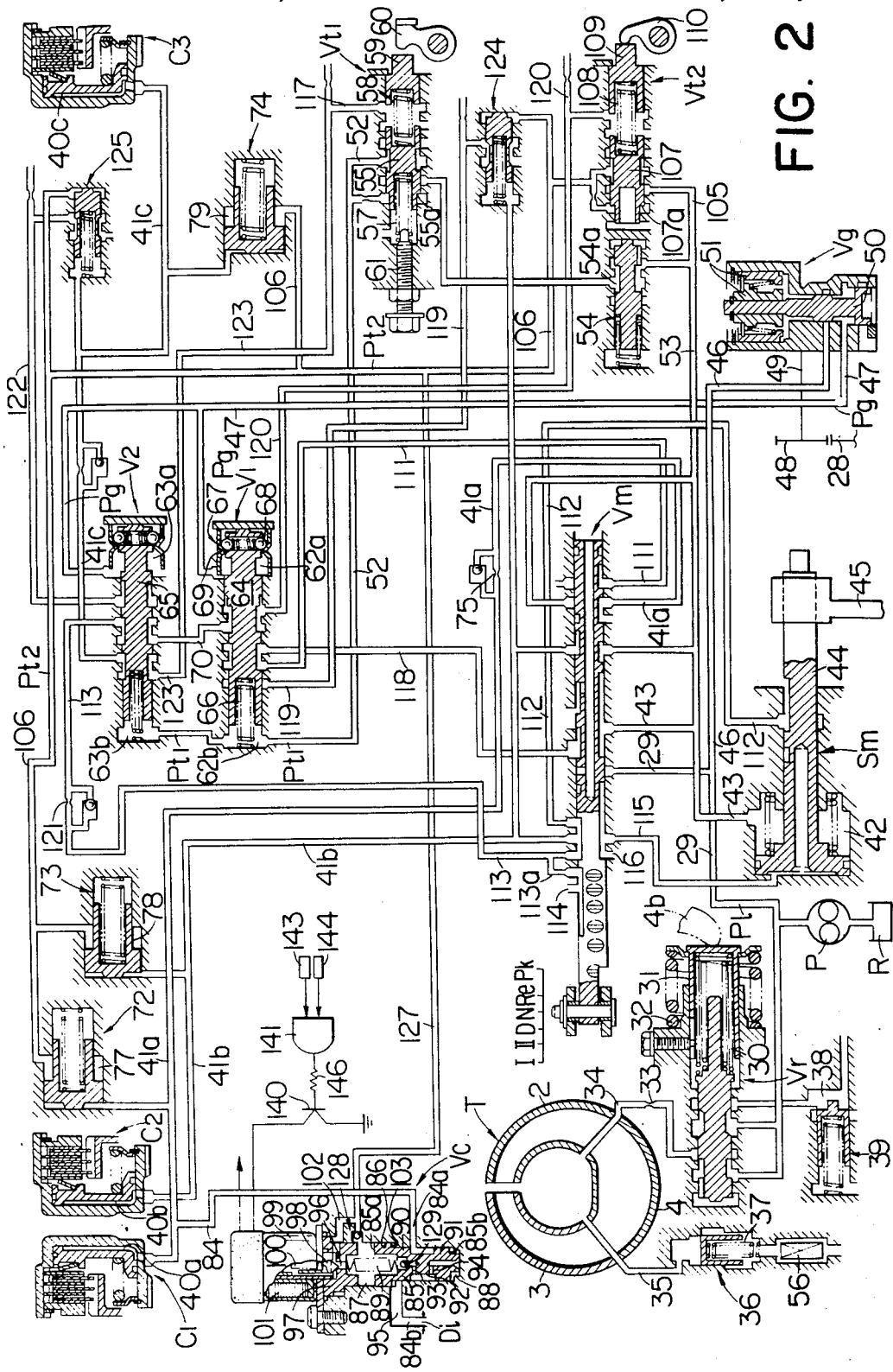
FIG. 2 is an oil pressure control circuit diagram showing one embodiment of the present invention.

A pump driving gear 8 for driving an oil pressure pump P shown in FIG. 2 is provided on the right end of the pump vane wheel 2, and a stator arm 4b for controlling a regulator valve Vr shown in FIG. 2 is fixedly mounted on the right end of the stator shaft 4a.

Between the input and output shafts 5, 6 parallel to each other of the auxiliary transmission M, there are provided in parallel a low-speed stage gear train $G_1$, a middle-speed stage gear train $G_2$, a high-speed stage gear train $G_3$ and a reverse gear train $G_r$. The low-speed stage gear train $G_1$ comprises a driving gear 17 connected to the input shaft 5 through a low-speed stage clutch $C_1$ serving as a frictionally engaging element for starting and engine brake, and a driven gear 18 fixedly mounted on the output shaft 6 and meshed with said gear 17. The middle-speed stage gear train $G_2$ comprises a driving gear 19 connected to the input shaft 5 through a middle-speed stage clutch $C_2$ and a driven gear 20 connected to the output shaft 6 through a switching clutch $C_s$ and meshed with said gear 19. The high-speed stage gear train $G_3$ comprises a driving wheel 21 fixedly mounted on the input shaft 5 and a driven gear 22 connected to the output shaft 6 through a high-speed clutch $C_3$. The reverse gear train Gr comprises a driving gear 23 formed integrally with the driving gear 19 of the middle-speed stage gear train $G_2$, a driven gear 24 connected to the output shaft 6 through the switching clutch Cs and an idle gear 25 meshed with both the gears 23, 24. The switching clutch Cs is disposed between the driven gears 20, 24, and the driven gears 20, 24 can be selectively connected to the output shaft 6 by shifting a selector sleeve 26 of the clutch Cs to a forward-movement position on the lefthand or to a reverse position on the righthand in the figure.

If only the low-speed stage clutch $C_1$ is engaged when the selector sleeve 26 is retained at the forward-movement position as shown, the driving gear 17 is connected to the input saft 5 to establish the low-speed stage gear train $G_1$, through which gear train $G_1$, the torque is transmitted from the input shaft 5 to the output shaft 6. Next, when the middle-speed stage clutch $C_2$ is engaged while the low-speed stage clutch $C_1$ is disengaged, the driving gear 19 is connected to the input shaft 5 to establish the middle-speed stage gear train $G_2$, through which gear train $G_2$, the torque is transmitted from the input shaft 5 to the output shaft 6. When the high-speed stage clutch $C_3$ is engaged while the low-speed stage clutch $C_1$ and the middle-speed stage clutch $C_2$ are disengaged, the driven gear 22 is connected to the output shaft 6 to establish the high-speed stage gear train $G_3$, through which gear train $G_3$, the torque is transmitted from input shaft 5 to the output shaft 6. Next, when the selector sleeve 26 is switched to the reverse position on the righthand and only the middle-speed stage clutch $C_2$ is engaged, the driving gear 23 and driven gear 24 are connected to the input shaft 5 and output shaft 6, respectively, to establish the reverse gear train Gr, through which gear train Gr, the torque is transmitted from the input shaft 5 to the output shaft 6.

The torque transmitted to the output shaft 6 is transmitted from an output gear 27 provided on the end of said shaft 6 to a large-diameter gear 28 of the differential device Df.

Referring now to FIG. 2, the oil pressure pump P sucks the oil from an oil tank R and feeds the oil under pressure into an operating oil passage 29. This pressure oil is regulated in pressure to a predetermined level by a regulator valve Vr, and thereafter fed to a manual valve Vm. This oil pressure is termed as the line pressure Pl.

The regulator valve Vr has a pressure regulating spring 30 and a spring receiving cylinder 31 for carrying an outer end thereof, and this spring receiving cylinder 31 can be moved to left and right to adjust the set load of the pressure regulating spring 30. The stator arm $4b$ comes into contact with the outer surface of the spring receiving cylinder 31 so as to apply the reaction force acting on the stator vane wheel 4, that is, the stator reaction force thereto. A stator spring 32 for carrying the stator reaction force is connected to the spring receiving cylinder 31. Accordingly, if the stator reaction force increases, the stator spring 32 is compressed, as a consequence of which the spring receiving cylinder 31 is moved leftwards to increase the set load of the pressure regulating spring 30 with the result that the oil pressure Pl of the operating oil passage 29 is increased.

A part of pressure oil regulated by the regulator valve Vr is introduced into the torque converter T via an inlet oil passage 34 having a throttle 33 to pressurize the interior thereof to prevent a cavitation, said internal pressure being determined by the magnitude of the throttle 33, the strength of a spring 37 of a check valve 36 provided on an outlet oil passage 35 of the torque converter T, and the like.

The oil having passed through the check valve 36 is returned to the oil tank R via an oil cooler 56.

The surplus portion of pressure oil discharged from the oil pressure pump P is introduced to a lubricating oil passage 38 from the regulator valve Vr and fed to various lubricating portions. A pressure regulating valve 39 is connected to the lubricating oil passage 38 in order to secure the oil pressure required to the minimum.

When the manual valve Vm is in a neutral position N as shown, the pressure oil fed to the valve Vm is not fed to any of said clutches $C_1$, $C_2$, $C_3$ nor to various other oil pressure operating portions. As a result, the three clutches $C_1$, $C_2$, $C_3$ are all disengaged and hence the torque of the engine E is not transmitted to the wheels W, W'.

When the manual valve Vm is moved leftwards by one step from the illustrated position and shifted to a drive position D, the operating oil passage 29 from the oil pressure pump P is communicated with oil passages 43, 118 and an oil passage 111 is communicated with an operating oil passage $41a$ leading to an oil pressure cylinder $40a$ of the low-speed stage clutch $C_1$ and provided with a unidirectional throttle 75. On the other hand, an oil passage 112 is disconnected from an operating oil passage $41b$ leading to an oil pressure cylinder $40b$ of the middle-speed stage clutch $C_2$, and an oil passage $113a$ is disconnected from an exhaust port 114. An oil passage 115 remains communicated with an exhaust port 116. The operating oil passage 43 is communicated with a spring chamber 42 of an oil pressure servo-motor Sm for shifting the selector sleeve 26, and therefore, a piston 44 of the servo-motor Sm remains at a position moved leftwards as shown to hold the selector sleeve 26 at the forward-movement position as shown in FIG. 1 through a shift fork 45. Thus, the reverse gear train Gr is placed in an inoperative state.

An inlet oil passage 46 in communication with an input port of a means for generating oil pressure proportional to vehicle speed, that is, a governor valve Vg is branched from the operating oil passage 29, and a first signal oil passage 47 extends from an output port of the valve Vg.

The governor valve Vg, which is well known, is rotated about its own rotational shaft 49 by a gear 48 meshed with the large-diameter gear 28 of the differential device Df. Thus, the rotational speed thereof is proportional to the vehicle speed, and therefore, the governor valve Vg can release the oil pressure proportional to the vehicle speed, that is, a governor pressure Pg, to the first signal oil passage 47 by the action of the centrifugal force acting on a weight 51 of a spool valve body 50.

An oil passage 53 is branched from the operating oil passage 43 and connected to a first throttle valve $Vt_1$ through a modulator valve 54. The modulator valve 54 is of a pressure reducing valve which is biased toward the closing side by a spring force and urged toward the opening side by the modulator pressure at an output port $54a$, and it determines an upper limit value of the inlet pressure of the first throttle valve $Vt_1$.

The first throttle valve $Vt_1$, which is well known, comprises a spool valve body 55, a control spring 58 for biasing the valve body 55 leftwards, a return spring 57 for biasing the valve body 55 rightwards, a control spring 59 for carrying the outer end of the control spring 58, a control cam 60 rotated in association with an increase in opening degree of the throttle valve of the engine E to move the control piston 59 leftwards, an adjusting bolt 61 capable of adjusting the set load of the return spring 57 and the like. When the control piston 59 is moved leftwards, the displacement thereof causes the spool valve body 55 to be pushed leftwards through the control spring 58. With this leftward movement, the oil pressure released to a second signal oil passage 52 acts on a left shoulder $55a$ of the spool valve body 55 so as to push back the spool valve body 55 rightwards, and therefore, after all, the first throttle valve $Vt_1$ can release the oil pressure proportional to the opening degree of the throttle valve of the engine E, that is, a throttle pressure $Pt_1$, to the second signal oil passage 52. Incidentially, counterclockwise movement of the control cam 60 throttles the degree of communication between an oil passage 117 and the oil tank R continuously.

The first and second signal oil passages 47, 52 are connected to pilot oil pressure chambers 62a, 62b; 63a, 63b, respectively, on both ends of a low-middle speed shift valve $V_1$ and a middle-high speed shift valve $V_2$. Thereby, spool valve bodies 64, 65 of these shift valves $V_1$, $V_2$ receive at both end surfaces thereof said governor pressure Pg and throttle pressure Pt and are operated as follows:

That is, the spool valve 64 of the low-middle speed shift valve $V_1$ initially remains at a position moved rightwards as shown by the force of a spring 66, and therefore, an oil passage 118 is communicated with the operating oil passage 41a through the oil passage 111, so that the low-speed stage clutch $C_1$ is pressurized and engaged. Next, when the vehicle speed increases to increase the governor pressure Pg and the force for moving the spool valve body 64 leftwards by the governor pressure Pg overcomes the force for moving the valve body 64 rightwards by the throttle pressure $Pt_1$ and spring 66, a click ball 68 moving together with the valve body 64 in a click motion mechanism 67 provided on the right end of the valve body 64 gets over a fixed locating projection 69 and the valve body 64 is rapidly switched to a leftwardly moved position. Thereby, the oil passage 111 is communicated with a drain oil passage 119 and the oil passage 118 is communicated with an oil passage 70. On the other hand, the oil passage 70 is disconnected from the drain passage 120. In this state, if the middle-high speed shift valve $V_2$ is at the position as shown, the oil passage 70 is communicated with an oil passage 113 provided therein with a unidirectional throttle 121 and further with the operating oil passage 41b through the manual valve Vm. Thus, the operating oil is supplied to the oil pressure cylinder 40b so as to pressurize and engage the middle-speed stage clutch $C_2$. As a result, the middle-speed stage gear train $G_2$ is established.

When the vehcle speed further increases, the similar operation occurs also in the middle-high speed shift valve $V_2$, whereby the spool valve body 65 of the valve $V_2$ is moved leftwards due to the increasing governor pressure Pg to communicate the oil passage 113 with a drain oil passage 122 and the oil passage 70 with the operating oil passage 41c leading to the oil pressure cylinder 40c of the high-speed stage clutch $C_3$, and on the other hand, the operating oil passage 41c is disconnected from a drain oil passage 123. Thus, the middle-speed stage clutch $C_2$ is released from its engaged state, and instead the high-speed stage clutch $C_3$ is pressurized and engaged to establish the high-speed stage gear train $G_3$.

To alleviate the shock at the time of speed change, accumulators 72, 73, 74 are connected in parallel to the clutches $C_1$, $C_2$, $C_3$ hydraulically. A 1-2 orifice control valve 124 is provided in the drain oil passage 119, and a 2-3 orifice control valve 125 is provided in the drain oil passage 122, respectively.

The second throttle pressure $Pt_2$ from a second throttle valve $Vt_2$ as a means for generating the signal pressure proportional to engine output is guided to back pressure chambers 77, 78, 79 of those accumulators 72, 73, 74 through an oil passage 106. The second throttle valve $Vt_2$ is interposed between an oil passage 105 branched from the oil passage 53 and the oil passage 106, and it comprises a spool valve body 107, a control spring 108 for biasing the valve body leftwards, a control piston 109 for carrying the outer end of the control spring 108, and a control cam 110 rotated in association with an increase in opening degree of the throttle valve of the engine E to move the control piston 109 leftwards. When the control piston 109 is moved leftwards, the displacement thereof causes the the spool valve body 107 to be pushed leftwards through the control spring 108. With this leftward movement, the oil pressure released to the oil passage 106 acts on a left shoulder 107a of the spool valve body 107 so as to push back the spool valve body 107 rightwards. In this way, the second throttle valve $Vt_2$ can release the second throttle pressure $Pt_2$ proportional to the opening degree of the throttle valve of the engine E to the back pressure chambers 77-79 of the accumulators 72-74 through the oil passage 106. Incidentially, counterclockwise movement of the control cam 110 throttles the degree of communication between the drain oil passage 120 and the oil tank R continuously.

When the vehicle speed is lowered, the valve body 65 of the middle-high speed shift valve $V_2$ is first moved rightwards to shift the change gear ratio from the high-speed stage to the middle-speed stage. When the vehicle speed is further lowered, the valve body 64 of the low-middle speed shift valve $V_1$ is moved rightwards to give the change gear ratio of the low-speed stage. It is noted to be of importance that the operating oil fed to the low-speed stage clutch $C_1$ passes the unidirectional throttle 75 in such change gear ratio of the low-speed stage with the shift lever being at the drive position D.

The halfway part of the operating oil passage 41a is connected to the accumulator 72, and an oil passage 84 directly leading to the oil tank R is connected to the halfway part of the operating oil passage 41a. A creep preventing valve Vc of pilot type is disposed halfway of the oil passage 84.

The creep preventing valve Vc has a spool valve body 85 which is housed in a cylindrical valve chamber 86 formed in the intermediate part of the oil passage 84 so as to divide the passage 84 into an upstream portion 84a and a downstream portion 84b, whereby oil chambers 87, 88 are defined in the upper and lower parts of the valve body 85, respectively. A return spring 89 for biasing the spool valve body 85 downwards is housed in the upper oil chamber 87. The spool valve body 85 comprises a pair of upper and lower lands 90, 91, an annular grooves 92 located therebetween, and orifices 93, 94 causing the groove 92 to be communicated with the upper oil chamber 87 and the lower oil chamber 88, respectively. The annular groove 92 is always communicated with the upstream portion 84a, and the upper land 90 opens and closes a port 95 of the downstream portion 84b opened to the valve chamber 86 upon the vertical movement thereof. The port 95 is preferably formed to have a circular section or the like such that the effective opening area is gradually increased as the upper land 90 moves upwards.

An oil passage 127 branched from the oil passage 106 for guiding the second throttle pressure $Pt_2$ from the second throttle valve $Vt_2$ is connected to the upper oil chamber 87 through a check valve 128 allowing the operating oil to flow only in a direction toward the upper oil chamber 87 from the oil passage 127. Another check valve 129 is provided between the orifice 93 and the upper oil chamber 87 to prevent the second throttle pressure $Pt_2$ guided to the upper oil chamber 87 from acting reversely on the lower oil chamber 88. The check valve 129 is carried by the lower end of the return spring 89 to be held in a predetermined position.

In this connection, a first pressure receiving surface 85a of the spool valve body 85 exposed to the upper oil chamber 87 is made to have the pressure receiving area larger than that of a second pressure receiving surface 85b thereof exposed to the lower oil chamber 88. A shoulder 103 of the valve body 85 to render the above difference in pressure receiving areas is located facing the opening port 95, as a consequence of which there causes no adverse effect on the vertical movement of the valve body 85.

An end wall member 97 having an orifice 96 is disposed on the upper end of the valve chamber 86, and a solenoid valve 99 including a pilot needle valve 98 adapted to open and close the orifice 96 is disposed above the member 97. The needle valve 98 is arranged to close the orifice 96 by the resilient force of a spring 100 and open the orifice 96 when a solenoid 101 is excited. In an opened state, the orifice 96 is communicated with a bypass oil passage 102 branched from the oil passage 127 at a position nearer to the second signal oil passage 106 than the check valve 128.

When the solenoid 101 is excited and the orifice 96 is opened, the upper oil chamber 87 is communicated with the oil passage 127 through the orifice 96 and the bypass oil passage 102, whereby the oil pressure in the upper oil chamber 87 is lowered. Accordingly, the spool valve body 85 moves upwards by the force acting on the second pressure receiving surface 85b exposed to the lower oil chamber 88, thus opening the oil passage 84. Since the pressure in the operating oil passage 41a, that is, the low-speed stage clutch $C_1$ at this time is determined by the resilient force of the return spring 89 and the area of the second pressure receiving surface 85b of the spool valve body 85, occurrence of the creep phenomenon can be prevented by setting said pressure lower than the engaging pressure of the low-speed stage clutch $C_1$.

Incidentally, when the valve body 64 of the low-middle speed shift valve $V_1$ or the valve body 65 of the middle-high speed shift valve $V_2$ is moved leftwards to establish the change gear ratio of the middle-speed stage or the high-speed stage, the oil pressure in the operating oil passage 41a becomes zero with the result that the spool valve body 85 will not move upwards and the creep preventing valve Vc will not be operated.

The solenoid 101 of the solenoid valve 99 is grounded through a transistor 140, to the base of which is applied the output from an AND gate 141 through a resistor 146. To the input terminals of the AND gate 141 there are connected an engine speed sensor 143 which detects the speed of revolution of the engine E and outputs a high level signal when the detected speed is lower than a reference value, and a braking sensor 144 which outputs a high level signal when the brake pedal is trod on. Thus, when the vehicle is stopped at a street intersection with the foot placed on the brake pedal, the outputs of the both sensors 143, 144 assume high levels to excite the solenoid 101, whereby the creep preventing valve Vc is opened and occurrence of the creep phenomenon is prevented.

In the above process of creep prevention, the throttle 75 disposed halfway of the oil passage 41a plays an essential role. Now assuming that a diameter of the throttle 75 is d, a diameter of the downstream portion 84b of the oil passage 84 in the creep preventing valve Vc is Di, a discharge pressure of the oil pressure pump P is Pl, and an oil pressure in the operating oil passage 41a, is p, the following equation is obtained.

$$\frac{\pi d^2}{4} \sqrt{Pl - p} = \frac{\pi Di^2}{4} \sqrt{p}$$

Substitution of Pl=8.5 kg/cm², p=1.0 kg/cm², d=1.7 mm into the above equation results in Di=2.8 mm. In practice, other factors should be considered, and therefore, Di is set in a range of 5-6 mm$\phi$. In any case, Di has not a so large value. To attain good responsivity at the time of starting, the creep preventing valve Vc is disposed as near as possible to the low-speed stage clutch $C_1$.

When the manual valve Vm is shifted to a shift position other than the drive position D, e.g., an engine brake position, namely, a first speed retaining position I, only the low-speed stage clutch $C_1$ is pressurized and engaged. As an alternative, when the valve Vm is shifted to a middle-speed stage retaining position II or reverse position Re, only the middle-speed stage clutch $C_2$ is pressurized and engaged to establish the middle-speed stage gear train $G_2$ or reverse gear train Gr. In particular, when the manual valve Vm is shifted to the reverse position Re, the piston 44 of the servo-motor Sm receives the pressure oil on the left end face thereof and the spring chamber 42 is communicated with the oil tank R, whereby the piston 44 is moved rightwards to establish the reverse gear train Gr as previously noted. Besides, a shift position Pk in the manual valve Vm designates a parking position.

Next, the operation of this embodiment will be explained. It is now assumed that the vehicle is stopped, for example, at a street intersection with the foot placed on the brake pedal. In this case, since both the sensors 143, 144 output high level signals, the output of the AND gate 141 assumes a high level, and therefore, the transistor 140 is conducted to excite the solenoid 101. Accordingly, the pilot needle valve 98 is lifted up and the upper oil chamber 87 is communicated with the oil passage 127 through the orifice 96 and the bypass oil passage 102. At this time, since the accelerator pedal is not trod on, the oil pressure in the oil passage 127 is zero, and therefore, the pressure in the upper oil chamber 87 is lowered and the spool valve body 85 is moved upwards to open the oil passage 84. As a result, the oil pressure in the operating oil passage 41a is lowered below the engaging pressure of the low-speed stage clutch $C_1$, thus preventing occurrence of the creep phenomenon.

Next, when the brake pedal is released to start the vehicle, the solenoid 101 is deenergized and the pilot needle valve 98 is descended to stop exhaust of the pressure oil from the upper oil chamber 87, whereupon the spool valve body 85 is moved downwards by the pressure oil fed to the upper oil chamber 87 through the orifice 93 and the check valve 129 to close the oil passage 84. On this occassion, if the solenoid 101 is repeatedly excited and deenergized at about 20 cycles for approx. 0.5 second using an electrical circuit not shown so as to gradually increase the oil pressure fed to the cylinder 40a of the low-speed stage clutch $C_1$, the shock at the time of starting can be greatly alleviated. When the accelerator pedal is trod on in this state, the second throttle pressure $Pt_2$ is guided to the upper oil chamber 87 to forcibly move the throttle valve body 85 downwards, even during the time the solenoid 101 still undergoes the ON/OFF excitation, with the result that the oil pressure applied to the low-speed stage clutch $C_1$ is increased abruptly.

Meanwhile, when the driver, who makes it a habit to drive the car using both feet, places the right foot on the accelerator pedal with the left foot continuing to tread on the brake pedal, the solenoid valve 101 was deenergized and this resulted in the relatively large shock in the conventional digital control system. Even in such a case, the shock can be naturally moderated by ON/OFF controlling the solenoid 101 as previously noted, but a time lag is now enlarged at the time of quick starting, thus resulting a fear that the low-speed stage clutch may be damaged. Stated differently, it was impossible in the prior art to make ON/OFF control of the solenoid valve 101 when the accelerator pedal is trod on. According to this embodiment, however, the spool valve body 85 is forcibly pushed to closed position by the second throttle pressure $Pt_2$ proportional to the opening degree of throttle valve of the engine, and therefore, the low-speed stage clutch $C_1$ is also controlled based on an analog valve proportional to the opening degree of engine throttle, whereby the shock at the time of reengagement of the low-speed stage clutch $C_1$ can be reduced and hence the starting responsivity is improved.

It is to be understood that, because the increasing rate of the second throttle pressure $Pt_2$ relative to the opening degree of engine throttle is generally low, the pressure receiving area of the first pressure receiving surface 85a for biasing the spool valve body 85 toward the closing side is set larger than that of the second pressure receiving surface 85b for biasing the valve body 85 toward the opening side.

Figure 3:
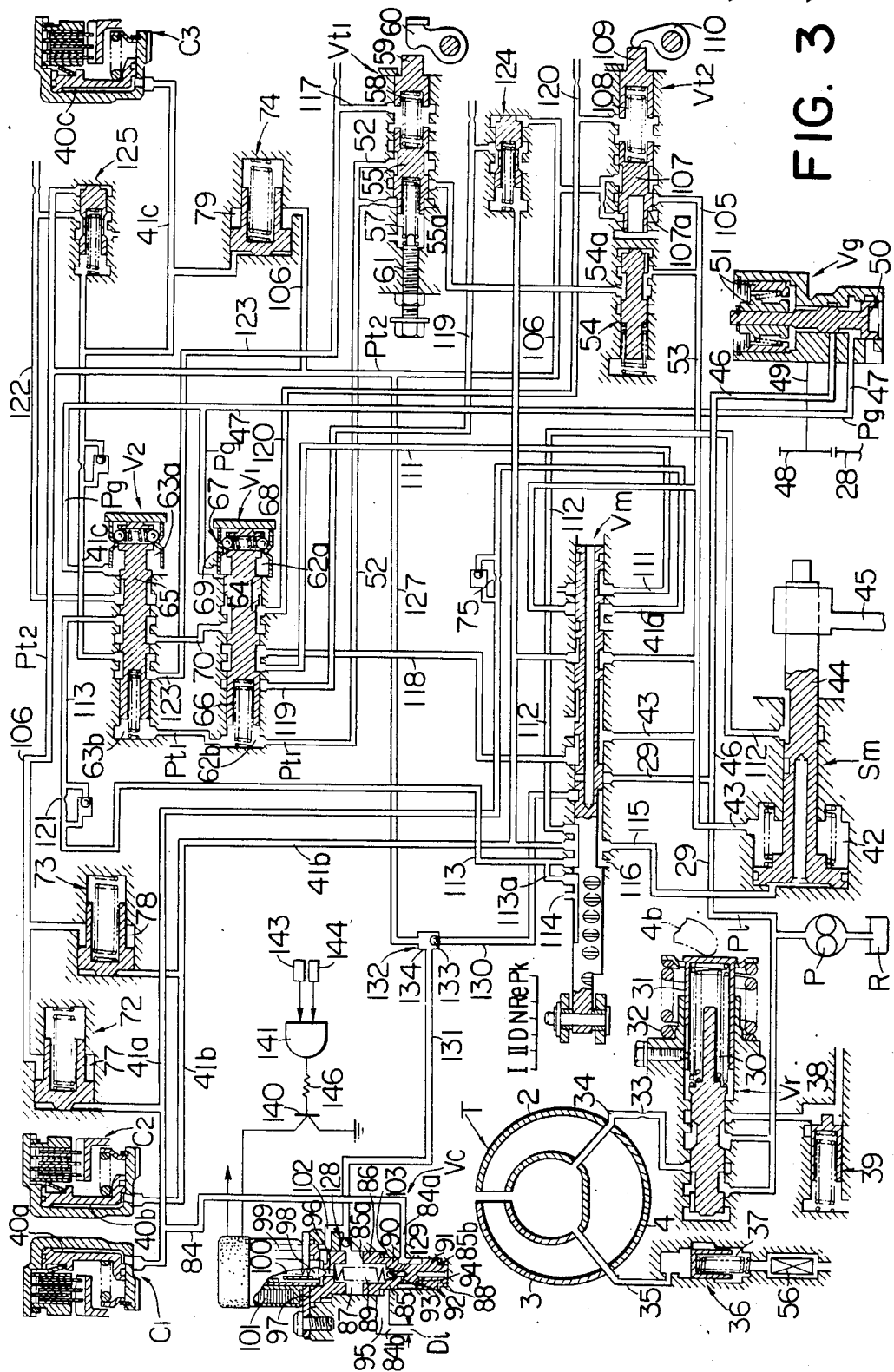
FIG. 3 is an oil pressure control circuit diagram showing another embodiment of the present invention.

Referring now to FIG. 3 there is shown an oil pressure control circuit diagram according to another embodiment of the present invention, an oil passage 131 is connected to the upper oil chamber 87 of the creep preventing valve Vc through a check valve 128, and on the other side, the oil passage 131 is connected through a high-select valve 132 to an oil passage 127 for guiding the second throttle oil pressure $Pt_2$ and to an oil passage 130 which is communicated with the oil pressure source, that is, oil pressure pump P at the time of effecting the engine brake. The high-select valve 132 includes a spherical valve body 133 housed in a casing 134 to which are connected said oil passages 127, 130 in opposite relation, whereby the higher oil pressure between those in the oil passages 127 and 130 is guided to the oil passage 131.

Figure 4:
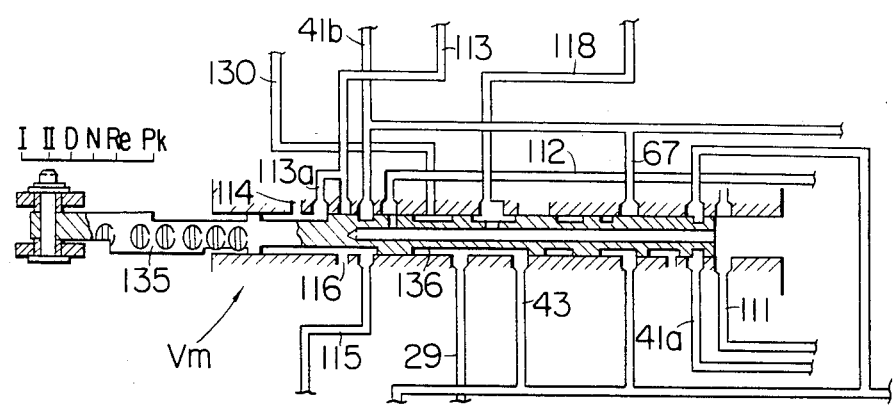
FIG. 4 is a view showing the connected state of oil passages when a manual valve in FIG. 2 is shifted to the engine brake position.

The manual valve Vm is interposed between the oil passage 130 and the operating oil passage 29 communicating with the oil pressure pump P. When the manual valve Vm is shifted to the engine brake position, that is, the first speed retaining position I as shown in FIG. 4, the oil passage 130 is communicated with the operating oil passage 29 through a groove 136 formed in the outer periphery of a spool valve body 135 of the manual valve Vm.

Therefore, even if the solenoid 101 is erroneously excited to open the orifice 96 due to an internal short of the transistor 141 or failure of the engine speed sensor 143, the line pressure Pl is introduced to the upper oil chamber 87 at the time of effecting the engine brake and the spool valve body 85 is forcibly moved downwards to close the oil passage 84, whereby the low-speed stage clutch $C_1$ is engaged and the engine brake is surely effected.

FIG. 5 shows an oil pressure control circuit diagram according to still another embodiment of the present invention. In this embodiment, an oil passage 127 for guiding the second throttle pressure $Pt_2$ and an oil passage 137 branched from the first signal oil passage 47 for guiding the governor pressure Pg are connected to the oil passage 131 through a high-select valve 132. According to this embodiment, the governor pressure Pg is guided to the upper oil chamber 87 through the high-select valve 132 even at the time of effecting the engine brake where the second throttle pressure $Pt_2$ becomes zero, whereby at the time of effecting the engine brake the creep preventing valve Vc is positively operated to its closed position for ensuring the engine brake.

Although in the foregoing embodiments the engine speed sensor 143 and the braking sensor 144 were used by way of example as detectors for exciting the solenoid 101, other detecting means such as a shift position sensor or water temperature detecting sensor may be used. It is not necessarily required for the bypass oil passage 102 to be connected to the oil passage 127 (in the embodiment of FIG. 2) or the oil passage 131 (in the embodiments of FIGS. 3 and 5). The bypass passage 102 may be communicated with the oil tank R instead. In this case, however, the flow area of the orifice 96 must be set at a sufficiently small amount.

According to the first feature, as fully described hereinabove, since the creep preventing valve includes an oil chamber for closing the valve when oil pressure above a predetermined level is introduced thereto, and the signal pressure proportional to the engine output is introduced to the oil chamber, the reengaging force of a clutch for starting can be controlled based on an analog valve proportional to a tread-on amount of the accelerator pedal, and therefore, the reengaging operation is performed smoothly with less shock. Even at the time of quick starting where the accelerator pedal is heavily trod on, there causes no time lag and the good responsivity can be attained. Further, since the creep preventing valve is forcibly shifted to its closed position by the oil pressure proportional to the engine output, it becomes possible to achieve the reliable operation even if the oil contains dust mixed therein.

According to the second feature, since the oil pressure from an engine output proportional signal pressure generating means is introduced through a check valve to the oil chamber for biasing the creep preventing valve to the closed position, and a solenoid valve is provided for discharging the oil pressure from the oil chamber, the creep preventing valve is operated by the oil pressure from the engine output proportional signal pressure generating means prior to actuation of the solenoid valve, whereby oil pressure control can be effected without causing any interference on the electrical control system. As a result, in addition to the effect of the first feature, there can be attained an effect that the vehicle can be reliably started irrespective of failure in the electrical control system.

According to the third feature, since the engine output proportional signal pressure generating means and an oil passage communicating with the oil pressure source at the time of effecting the engine brake are connected to the oil chamber of the creep preventing valve through a high-select valve, the creep preventing valve can be closed by the oil pressure from the oil pressure source at the time of effecting the engine brake so as to surely engage a frictionally engaging element for the engine brake. Thus, the reliability is improved in addition to the effect of the first feature.

Finally according to the fourth feature, since the engine output proportional signal pressure generating means and vehicle speed proportional signal pressure generating means are connected to the oil chamber of the creep preventing valve through a high-select valve, the creep preventing valve can be closed by the vehicle speed proportional signal pressure at the time of effecting the engine brake so as to surely engage the frictionally engaging element for the engine brake. Thus, similarly to the third feature, an effect of improving the reliability can be attained in addition to the effect of the first feature.

What is claimed is:

1. In a creep preventing device for vehicles equipped with an automatic transmission, comprising;
   a fluid type torque converter;
   an auxiliary transmission having a frictionally engaging element for starting and connected to said torque converter; and
   a creep preventing valve disposed in an oil passage that is branched from an operating oil passage leading to said frictionally engaging element and that leads to an oil tank, said creep preventing valve being adapted to open said oil passage during the idle operation of the vehicle;
   the improvement wherein said creep preventing valve is constructed such that it is operated in the opening and the closing directions by a common hydraulic pressure of a hydraulic pressure source acting on opposite surfaces thereof, said opposite surfaces consisting of a first pressure receiving surface of a larger area for receiving thereon the hydraulic pressure toward a closing side of the valve and a second pressure receiving surface of a smaller area for receiving thereon said hydraulic pressure toward an opening side of the valve, wherein during ordinary operating conditions, said hydraulic pressure is allowed to act upon both pressure receiving surfaces to keep the valve in closed state, and during the idling operation the pressure acting upon the first pressure receiving surface is released to allow the valve to move to an open position, said creep preventing valve having an oil chamber connected via an oil path to means for producing a signal pressure proportional to an engine output, said valve being moved to a closed position when a signal pressure above a predetermined value is introduced into said oil chamber, said oil chamber being connected to said oil path via a check valve allowing the pressure to flow only in a direction toward said oil chamber from the oil path, said oil chamber being communicated with said operating oil passage through an orifice, a solenoid valve being provided and adapted to exhaust the hydraulic pressure acting on said first pressure receiving surface during the idling operation.

2. A creep preventing device as defined in claim 1, wherein said first pressure receiving surface is exposed to said oil chamber and said solenoid valve is interposed in a bypass oil passage connecting between said oil chamber and said oil path while bypassing said check valve.

3. In a creep preventing device for vehicles equipped with an automatic transmission, comprising:
   a fluid type torque converter;
   an auxiliary transmission having a frictionally engaging element for starting and connected to said torque converter; and
   a creep preventing valve disposed in an oil passage that is branched from an operating oil passage leading to said frictionally engaging element and that leads to an oil tank, said creep preventing valve being adapted to open said oil passage during the idle operation of the vehicle;
   the improvement wherein said creep preventing valve is constructed such that it is operated in the opening and the closing directions by a common hydraulic pressure of a hydraulic pressure source acting on opposite surfaces thereof, said opposite surfaces consisting of a first pressure receiving surface of a larger area for receiving thereon the hydraulic pressure toward a closing side of the valve and a second pressure receiving surface of a smaller area for receiving thereon said hydraulic pressure toward an opening side of the valve, wherein during ordinary operating conditions, said hydraulic pressure is allowed to act upon both pressure receiving surfaces to keep the valve in closed state, and during the idling operation the pressure acting upon the first pressure receiving surface is released to allow the valve to move to an open position, said creep preventing valve having an oil chamber connected via a high-select valve to means for producing a hydraulic pressure proportional to an engine output and an oil passage capable of being placed in communication with another hydraulic pressure source in interlocking relation with movement of a shift lever to an engine brake position, said creep preventing valve being moved to a closed position when a hydraulic pressure above a predetermined value is introduced into said oil chamber through said high-select valve from either one of said means and said another hydraulic pressure source.

4. A creep preventing device a defined in claim 3, wherein said hydraulic pressure sources are identical with each other.

5. In a creep preventing device for vehicles equipped with an automatic transmission, comprising:
   a fluid type torque converter;
   an auxiliary transmission having a frictionally engaging element for starting and connected to said torque converter; and
   a creep preventing valve disposed in an oil passage that is branched from an operating oil passage leading to said frictionally engaging element and that leads to an oil tank, said creep preventing valve being adapted to open said oil passage during the idle operation of the vehicle;
   the improvement wherein said creep preventing valve is constructed such that it is operated in the opening and the closing directions by a common hydraulic pressure of a hydraulic pressure source acting on opposite surfaces thereof, said opposite surfaces consisting of a first pressure receiving surface of a larger area for receiving thereon the hydraulic pressure toward a closing side of the valve and a second pressure receiving surface of a smaller area for receiving thereon said hydraulic pressure toward an opening side of the valve, wherein during ordinary operating conditions, said hydraulic pressure is allowed to act upon both the pressure receiving surfaces to keep the valve in closed state, and during the idling operation the pressure acting upon the first pressure receiving surface is released to allow the valve to move to an open position, said creep preventing valve having an oil chamber which is connected via a high-select valve to an engine output proportional signal pressure generating means which releases a signal pressure proportional to an engine output and a vehicle speed proportional signal pressure generating means which releases a signal pressure proportional to a vehicle speed, said creep preventing valve being moved to a closed position when the signal pressure above a predetermined value is introduced into said oil chamber through said high-select valve from either one of said engine output proportional signal pressure generating means and said vehicle speed proportional signal pressure generating means.

6. A creep preventing device as defined in claim 3 or 5, wherein said creep preventing valve is actuated to open said oil passage when an engine speed is lower than a reference value and at the same time a brake pedal is trod on.

* * * * *